United States Patent [19]
Paulus

[11] Patent Number: 4,887,669
[45] Date of Patent: * Dec. 19, 1989

[54] WELL CLOSURE ASSEMBLY WITH CAP-TO-CASING ADAPTER

[76] Inventor: Cecil H. Paulus, Rte. 2, Box 495, Leesburg, Ind. 46538

[*] Notice: The portion of the term of this patent subsequent to Jun. 27, 2006 has been disclaimed.

[21] Appl. No.: 304,546

[22] Filed: Feb. 1, 1989

Related U.S. Application Data

[63] Continuation of Ser. No. 178,682, Apr. 7, 1988, Pat. No. 4,842,060, Continuation-in-part of Ser. No. 39,942, Apr. 20, 1987, Pat. No. 4,785,881.

[51] Int. Cl.[4] ..................... E21B 33/00; E21B 33/04
[52] U.S. Cl. ..................... 166/75.1; 166/85; 166/88; 166/89; 220/370; 220/372
[58] Field of Search ............ 166/75.1, 88, 89, 86; 138/89; 220/287, 210, 212, 254, 366, 367, 370, 372

[56] References Cited

U.S. PATENT DOCUMENTS

| | | | |
|---|---|---|---|
| 1,868,730 | 7/1932 | Dowrie | 220/372 |
| 2,494,679 | 1/1950 | Ward, Jr. | 220/372 |
| 2,707,030 | 4/1955 | Ortman | 166/88 |
| 3,035,732 | 5/1962 | Baker | 220/3.8 |
| 3,154,148 | 10/1964 | Peterson | 166/88 |
| 3,394,836 | 7/1968 | Millard | 220/210 |
| 3,563,310 | 2/1971 | Wellstein | 166/89 |
| 3,722,586 | 3/1973 | Baker | 166/89 |
| 4,023,699 | 5/1977 | Lien | 220/287 |

Primary Examiner—Bruce M. Kisliuk
Attorney, Agent, or Firm—Wendell E. Miller

[57] ABSTRACT

A cap-to-casing adapter (166) is provided for use with a well having a well casing (12) with a top (28), having a support plate (136) that engages the top (28) of the well casing (12), and having a well cap (138) that encloses both a top portion (142) of the well casing (12) and a top portion (144) of an electrical conduit (146). In use, the cap-to-casing adapter (166) is inserted between the top (28) of the well casing (12) and the support plate (136). The cap-to-casing adapter (166) provides insect-proof protection for the well, secures the electrical conduit (146) to the well, provides for locking the well cap (138) to the adapter (166) with a padlock (188), and provides a standardized inside diameter (198) for sealing the well without regard to variations in the inside diameter (200) of the well casing (12).

25 Claims, 4 Drawing Sheets

WELL CLOSURE ASSEMBLY WITH CAP-TO-CASING ADAPTER

BACKGROUND OF THE INVENTION

This patent application is a Continuation of U.S. patent application Ser. No. 07/178,682, filed 07 Apr. 1988, now U.S. Pat. No. 4,842,060, which is a Continuation-in-Part of patent application Ser. No. 07/039,942, filed 20 Apr. 1987, now U.S. Pat. No. 4,785,881.

FIELD OF THE INVENTION

The present invention relates to a plastic cap assembly for a well. More particularly, the present invention related to a cap-to-casing adapter which may be placed between the well cap assembly and the well casing.

DESCRIPTION OF THE RELATED ART

The related art includes Wellstein, U.S. Pat. No. 3,563,310, who provides a well cap assembly which includes an attaching ring that circumferentially circumscribes the well casing and that seals on the outside diameter of the casing, a well cap that circumscribes the well casing and that bolts to the attaching ring, and a support plate that rests on the top of the well casing and that supports the plug adapter assembly.

Crawford, U.S. Pat. No. 3,504,742, provides a well cap assembly in which an adapter circumscribes the well casing, is fastened to the well casing by radially-disposed set screws, and is sealed to the well casing by a resilient seal that engages the circumference of the well casing. The well cap bolts to the adapter.

Peterson, U.S. Pat. No. 3,154,148, provides a well adapter in which the well cap consists of a cover plate that is bolted to a flanged well casing, and in which a breather assembly is attached to the top of the cover plate.

Millard, U.S. Pat. No. 3,394,836, provides a fill tube cap such as is used in conjunction with underground fuel storage. His fill tube cap includes an adapter that is threaded to the fill pipe, a cap, and a camming lever that locks the cap to the adapter. The camming lever is maintained in the locking position by a padlock that engages both the camming lever and the adapter. The fill tube is sealed by resilient seals that are compressed between the top of the adapter and the underside of the cap.

Dowrie, U.S. Pat. No. 1,868,730, teaches a vent cap which circumscribes a pipe that extends upwardly from a tank containing flammable fluids. The vent cap is clamped to the circumference of the pipe; and a vent screen is provided in an underneath side of the vent cap.

Ward, Jr., U.S. Pat. No. 2,494,679, provides a vent cap of the type that is threaded onto a pipe and that includes screened openings.

SUMMARY OF THE INVENTION

In the present invention, a well closure assembly is provided in which the well cap includes an elongated unitary opening that is circumscribed by a flange and that encloses a top portion of the well casing and a top portion of an electrical conduit that is disposed parallel to the well casing and that is juxtaposed against the well casing. The well cap also circumscribes and covers a support plate that rests on the top of the well casing and that supports a plug assembly which is disposed in the well casing at some distance below the support plate.

Optionally, a pressure ring, seals, and bolts can be added to provide a pressure seal for the well.

The present invention also includes a cap-to-casing adapter which can be inserted between the well casing and the adapter plate. The cap-to-casing adapter includes a first hole that opens from the bottom and that both accepts and circumscribes the well casing, a second hole that opens from the bottom and that both accepts and circumscribes an electrical conduit that is disposed parallel to the well casing and that is spaced apart therefrom, and an elongated surface near the top thereof whose contour generally corresponds to the elongated unitary opening of the well cap.

The cap-to-casing adapter is adhesively secured to the outside of the well casing, and provides a cylindrical inside surface opening through the top thereof which accepts an engaging surface of the aforementioned support plate. Since the cap-to-casing adapter seals against the outside surface of the casing, it functions equally well without regard to the wall thickness, and the inside diameter, of the well casing. Further, since the cap-to-casing adapter provides an inside diameter which accepts the engaging surface of the support plate, the cap-to-casing adapter allows the use of the same sealing kit for sealing well casings with different wall thicknesses and different inside diameters.

In its most economical form, the present invention provides a well cap assembly in which air freely enters into and exits from the well casing and in which protection from entry of insects is not provided; but by adding a pressure ring and associated parts the well assembly is converted into a pressurized well.

The cap-to-casing adapter converts a well into a sanitary well in which insects are excluded by providing separate openings for the well casing and an electrical conduit and a screened passageway for air entry without danger of contamination by insects.

The present invention uses the same parts to provide a fluid-tight seal between the well casing and the support plate that are used when sealing a well that does not include the cap-to-casing adapter.

The cap-to-casing adapter allows using the same parts to seal the support plate to the well casing irrespective of the wall thickness of the well casing and the resultant variations of the inside diameters of the well casings.

Finally, the cap-to-casing adapter cooperates with the well cap to accept a padlock for locking the well cap to the well casing.

Thus the present invention prevents accidental contamination of the well, and contamination by vandalism. A common problem is that children will drop rocks into the well to hear them splash in the water, and that the rocks will wedge between the submersible pump and the well casing, making it extremely difficult to remove the pump from the casing.

It is an object of the present invention to provide an adaptable well closure assembly which may be used in its most economical form without protection for the exclusion of insects, which may be pressure sealed, which may include insect exclusion protection, and which allows the use of the same pressure sealing parts without regard to the thickness of the well casing and the resultant variations of inside diameter.

It is an object of the present invention to provide a cap-to-casing adapter that converts the well into a sanitary well, and that includes a screened passageway.

It is an object of the present invention to provide a cap-to-casing adapter that allows the use of the same sealing parts irrespective of the inside diameter of the well casing.

Finally, it is an object of the present invention to provide a cap-to-casing adapter that provides means for locking the well cap to the well casing.

Other objects of the invention will become obvious from the drawings and detailed description that are included herein.

DESCRIPTION OF THE PREFERRED EMBODIMENTS

Figure 1:
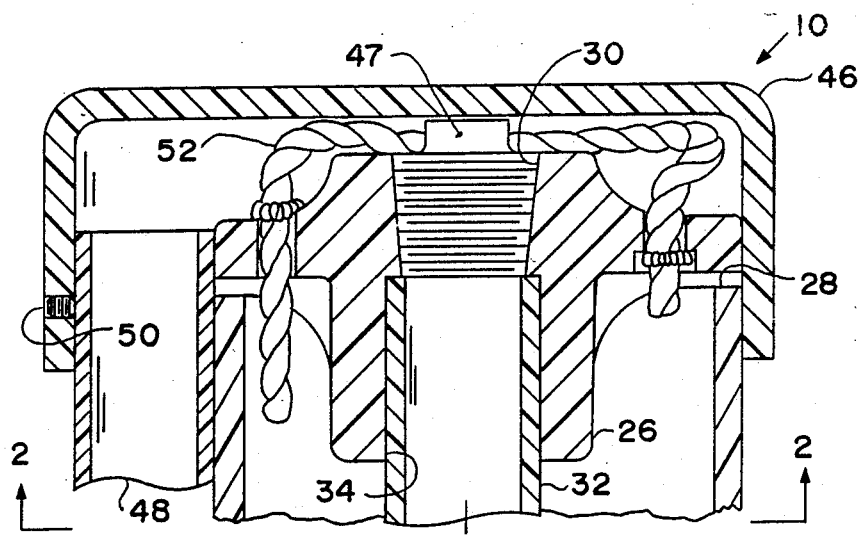
FIG. 1 is a cross-sectional elevation of one embodiment of a well cap assembly.

Referring now to the drawings, and more particularly to FIG. 1, a plastic well closure assembly 10 includes a plastic support plate 26 that is supported by a top 28 of a plastic well casing 12 that includes a threaded access opening 30 that is disposed coaxially with a longitudinally-disposed casing axis, or longitudinal axis, 14, and that includes a socket 34 with a plastic support tube 32 bonded therein. A plastic well cap 46 rests on a threaded plastic plug 47 in the access opening 30 of the support plate 26. A set screw 50 clamps a plastic electrical conduit 48 between the well cap 46 and the support plate 26 and secures the well cap 46 to the support plate 26. A rope 52 is provided which serves as a handle and which may be connected to a well adapter, not shown, same as shown and described in U.S. patent application Ser. No. 07/039,942, now U.S. Pat. No. 4,785,881.

Figure 3:
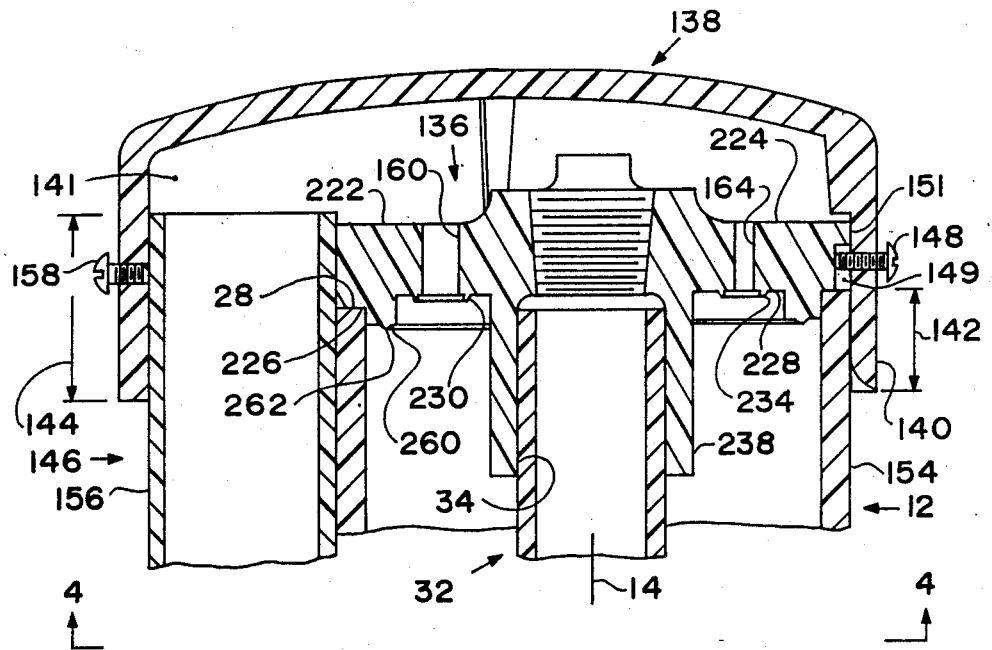
FIG. 3 is a cross-sectioned front elevation of a second, and preferred, embodiment of the present invention with a different support plate and a different well cap.
Figure 4:
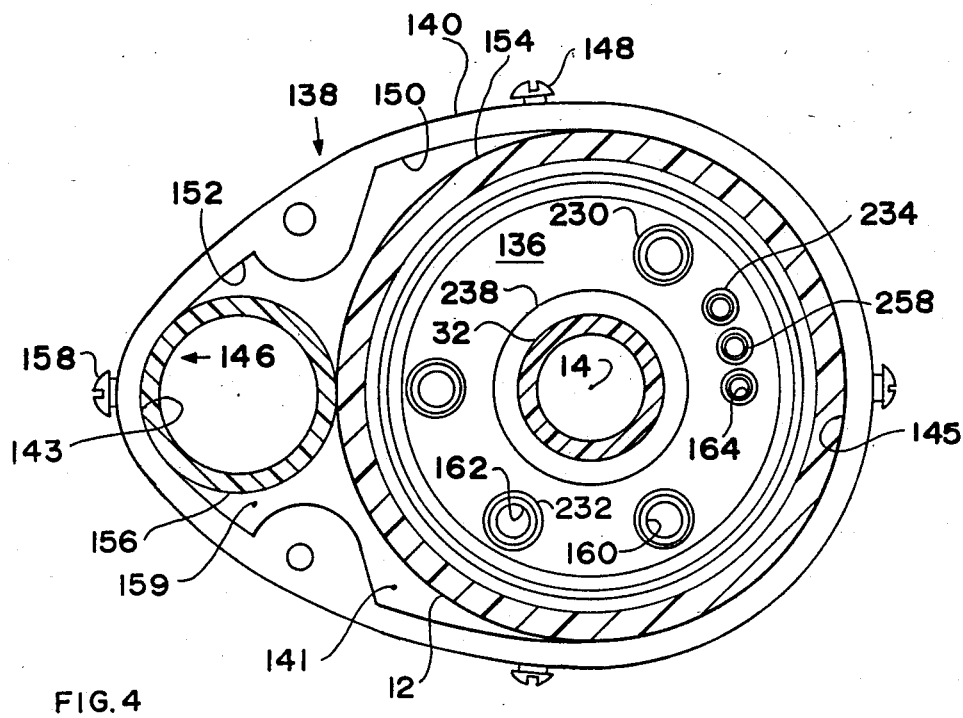
FIG. 4 is a bottom view of the second embodiment of FIG. 3, taken substantially as shown by view line 4—4 of FIG. 3.

Referring now to FIGS. 3 and 4, a plastic support plate 136 rests on the top 28 of the plastic well casing 12. A plastic well cap 138 includes a flange 140 that circumscribes a unitary opening 141 that is elongated by the diameter 156 of the conduit 146 between points 143 and 145. The unitary opening 141 encloses the support plate 136, a top portion 142 of the well casing 12, and a top portion 144 of a plastic vertically-exposed electrical conduit 146.

The well cap 138 is attached to the support plate 136 by screws 148 that engage notches 149 in the support plate 136, rather than engaging the well casing 12, so that the force of the screws 148 does not distort the well casing 12. Locking tabs 151 on the support plate 136 prevent the screws 148 from slipping off of the support plate 136.

As can be seen in FIG. 4, the flange 140 of the well cap 138 has an inside surface 150 whose contour 152 includes an outside diameter 154 of the well casing 12 and an outside diameter 156 of the electrical conduit 146. The top portion 144 of the conduit 146 is juxtaposed against the well casing 12, is enclosed by the flange 140 of the well cap 138, and is clamped against the well casing 12 by a screw 158.

In the embodiment of FIGS. 3 and 4, air can flow into and out of the well cap 138 through spaces 159 between the conduit 146, the well casing 12, and the flange 140 of the well cap 138. Air can then flow from the well cap 138 into the well via three equally-spaced bolt holes 160 and a rope-pull hole 162 in the support plate 136.

Figure 2:
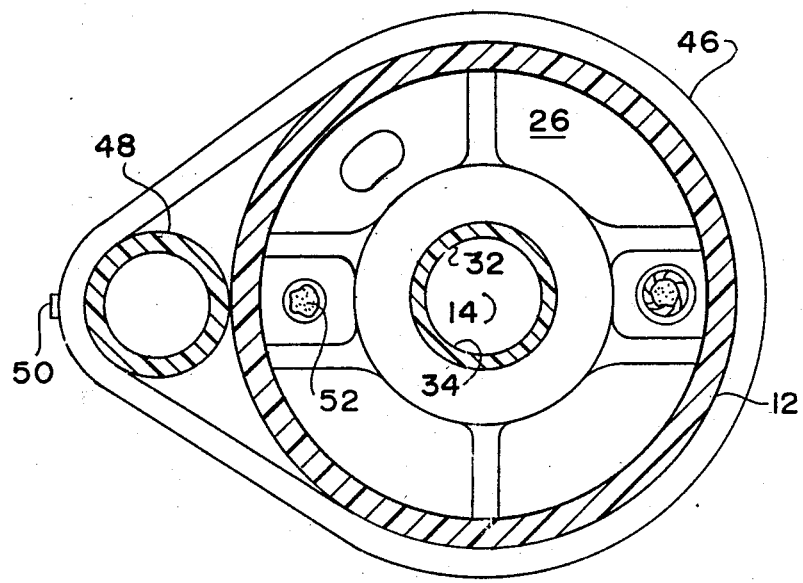
FIG. 2 is a cross-section of FIG. 1, taken substantially as shown by section line 2—2 of FIG. 1.

The plastic support tube 32 is bonded into the socket 34 of the support plate 136 as described for the embodiment of FIGS. 1 and 2; and three wire holes 164 are provided to receive electrical wires.

Figure 6:
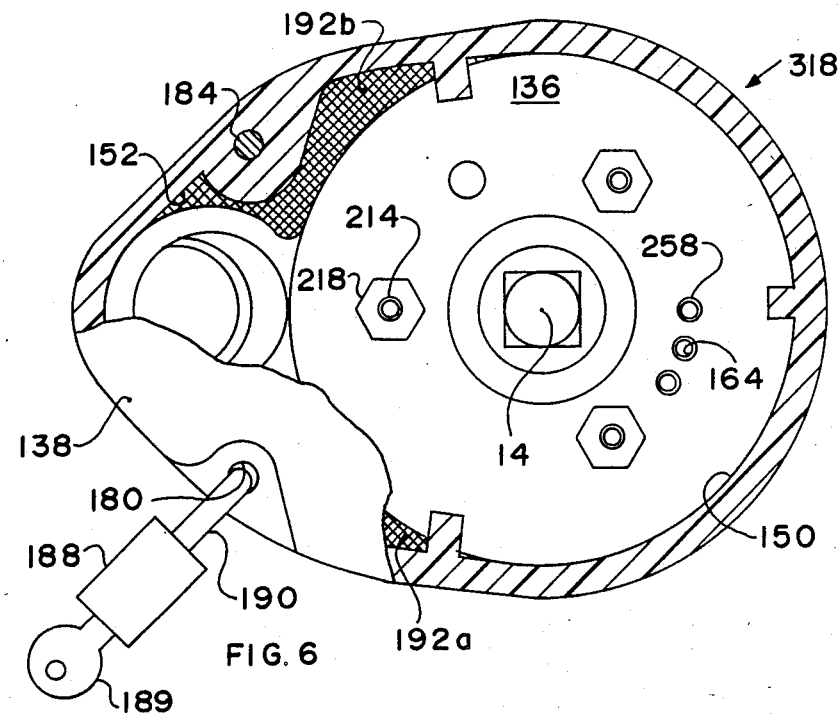
FIG. 6 is a top view of the third embodiment of FIG. 5, taken substantially as shown by view line 6—6 of FIG. 5, showing a portion of the well cap broken away to reveal the screened passageway of the cap-to-casing adapter, and showing a bolt and a padlock securing the well cap to the cap-to-casing adapter.
Figure 5:
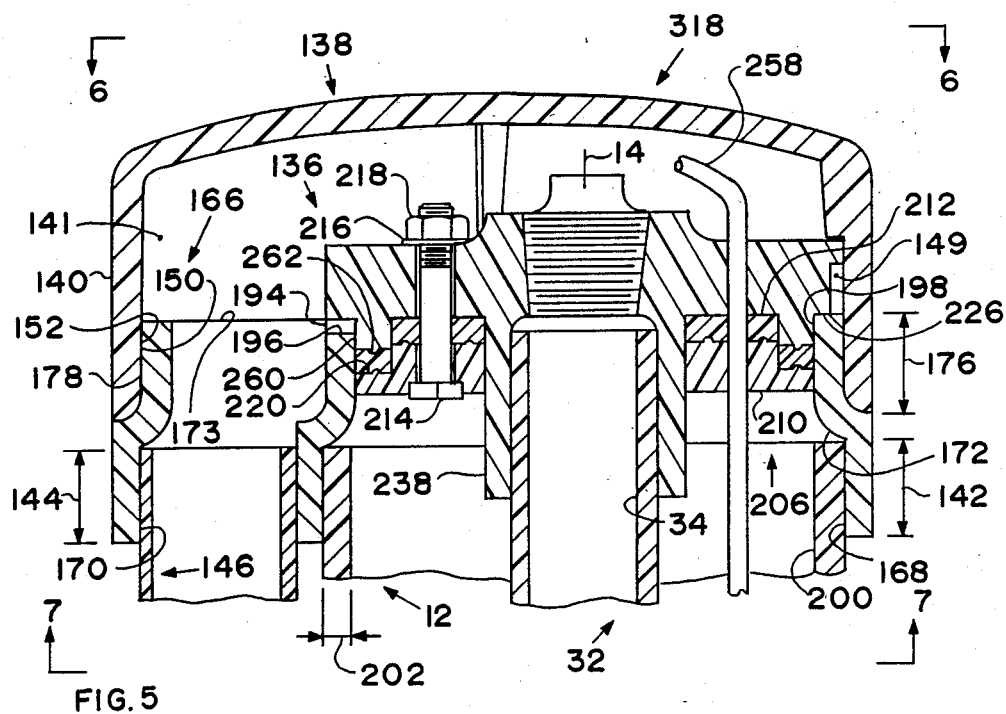
FIG. 5 is a cross-section of a partial front elevation of a third embodiment of the present invention, showing a cap-to-casing adapter interposed between the well casing and the well cap, and showing a sealed support plate assembly for use with artesian wells.
Figure 8:
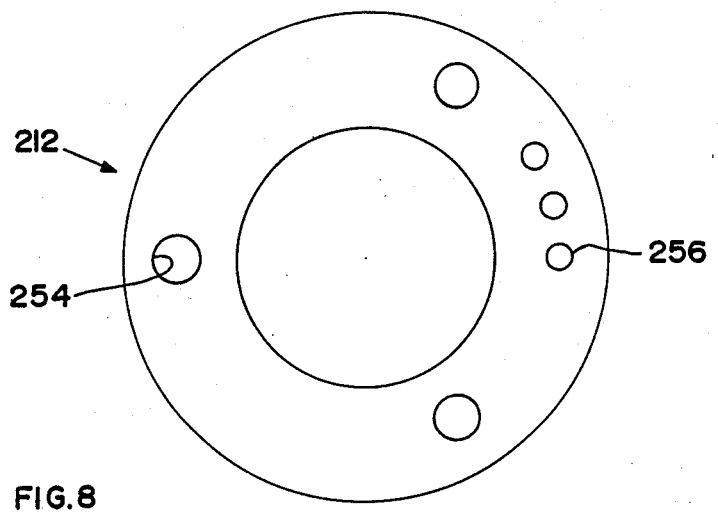
FIG. 8 is a plan view of one of the gaskets that can be used to provide a fluid-tight seal in the embodiments of FIGS. 3–7, taken substantially the same as FIG. 7 but of a slightly enlarged scale.
Figure 7:
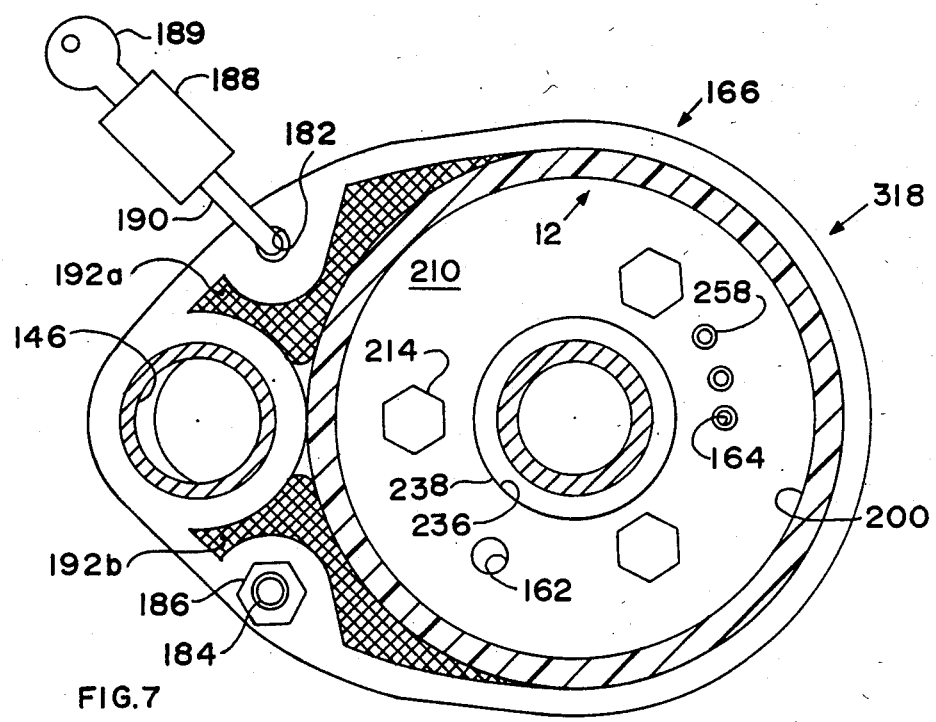
FIG. 7 is a bottom view of the third embodiment of FIG. 5, taken substantially as shown by view line 7—7 of FIG. 5.

Referring now to FIGS. 5–7, a plastic sizing adapter, or a plastic cap-to-casing adapter, 166 has been inserted between the well casing 12 and the well cap 138.

The cap-to-casing adapter 166 includes a first cylindrical opening 168 that slidably receives the top portion 142 of the well casing 12, a second cylindrical opening 170 that receives the top portion 144 of the electrical conduit 146, a locating surface 172 for engaging the top 28 of the well casing 12, and a top surface 173 that supports the support plate 136 above the top 28 of the well casing 12. The adapter 166 also includes an upper portion 176 whose outer contour 178 conforms to the contour 152 of the inside surface 150 of the flange 140, thereby sealingly excluding insects from the well. The upper portion 176 raises the well cap 138 above the top portions 142 and 144 of the casing 12 and conduit 146.

The adapter 166 may be bonded to the top portion 142 of the well casing 12, or the adapter 166 may be slidably installed over the well casing 12 without bonding. The electrical conduit 146 is secured in the second cylindrical opening 170 by any suitable means; and the well cap 138 is secured by two holes 180 in the well cap 138, two matching holes 182 in the adapter 166, two bolts 184, and two nuts 186 (one each shown).

Alternately (as shown), the well cap 138 may be secured to the cap-to-casing adapter 166 by one bolt 184, one nut 186, and by a key-released lock, or padlock, 188 that can be unlocked by a key 189 and whose shackle 190 passes through one of the holes 180 and one of the holes 182.

The padlock 188 is located outside the casing 12 and at a single circumferential location with respect to the longitudinal axis 14 as shown in FIGS. 5 and 7. As can be seen in FIGS. 5–7, the ability of the padlock 188 to secure the well cap 138 to the adapter 166 is dependent upon sliding engagement of the upper portion 176 of the adapter 166 with the unitary opening 141 of the well cap 138. Otherwise, the well cap 138 could be pivoted upwardly off of the adapter 166 with the padlock 188 still engaging the holes 180 and 182.

The adapter 166 includes insect-proof passageways, or screened passageways 192a and 192b which provide means for air to enter and exit from the well cap 138 and the well without allowing insects to enter.

The support plate 136 includes three lugs 194 which project downwardly, which are circumferentially spaced-apart, and which engage similarly-spaced slots 196 in the adapter 166, thereby providing a means for selectively positioning the support plate 136 in three different positions with respect to the adapter 166.

Referring now to FIGS. 3-7, for artesian wells, or for any other well in which it is desirable to provide a fluid-tight seal, either the embodiment of FIGS. 3 and 4, or the embodiment of FIGS. 5-7 may be adapted to seal the well. An important feature of the embodiment of FIGS. 5-7 is that the cap-to-casing adapter 166 includes a third cylindrical opening, or standardized inside diameter, 198 which provides a uniform diameter for the sealing parts irrespective to changes in an inside diameter 200 of the well casing 12, as it varies when well casings 12 have different wall thicknesses 202.

Referring now to FIGS. 5-9, a sealed support plate assembly 206 includes the plastic support plate 136, a plastic pressure ring 210, a first gasket, or seal, 212, a plurality of clamping bolts 214, a plurality of washers 216, a plurality of nuts 218, and a second gasket 220.

Referring now to FIGS. 3-4, the support plate 136 includes a plate portion 222 having a top surface 224 that is generally orthogonal to the casing axis 14, a shoulder portion, or engaging surface, 226 that is generally orthogonal to the casing axis 14 and that engages the top 28 of the casing 12, and a seal-receiving surface 228 that is generally orthogonal to the casing axis 14. The support plate 136 also includes the three bolt holes 160, the rope-pull hole 162, and the three wire holes 164 which all extend through the surfaces 224 and 228.

As best seen in FIGS. 3 and 4, the support plate 136 also includes three larger compression rings 230 that are each coaxial with one of the bolt holes 160 and that extend downwardly from the seal-receiving surface 228, another larger compression ring 232 that is coaxial with the rope-pull hole 162 and that extends downwardly, and three smaller compression rings 234 that are each coaxial with one of the wire holes 164 and that each extend downwardly from the seal-receiving surface 228.

Figure 9:
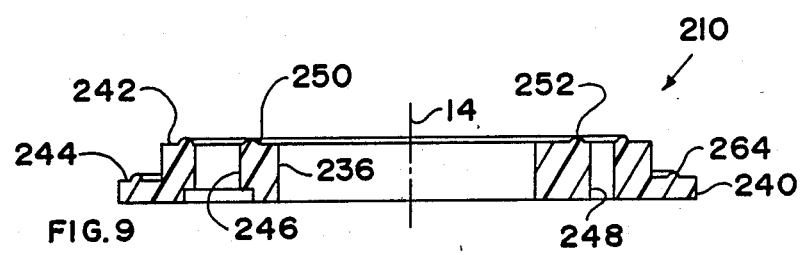
FIG. 9 is a cross-section of the pressure ring of FIG. 5, taken substantially the same as FIG. 5 but of a slightly enlarged scale.

Referring now to FIGS. 3-9, and more particularly to FIGS. 5 and 9, the plastic pressure ring 210 includes an inside diameter 236 that assembles around a tubular extension 238 of the support plate 136 and that provides a clearance therebetween, an outside diameter 240 that provides a clearance between the pressure ring 210 and the inside diameter 200 of the well casing 12, a first seal-receiving surface 242 that is generally orthogonal to the casing axis 14 and that generally corresponds to the seal-receiving surface 228 of the support plate 136, and a second seal-receiving surface 244 that is disposed radially outward from the seal-receiving surface 242 and that is generally orthogonal to the casing axis 14.

In addition, the pressure ring 210 includes three bolt holes 246, three wire holes 248, four larger compression rings 250, and three smaller compression rings 252, all of which are spaced to match like-named features of the support plate 136.

Preferably, the first gasket 212 incudes three bolt holes 254 and three wire openings 256. When assembled as shown in FIGS. 5-7, the first gasket 212 seals the rope-pull hole 162.

The larger compression rings, 230, 232, and 250, force the first gasket 212 into sealing engagement with both the clamping bolts 214 and the surfaces 228 and 242. In like manner, the smaller compression rings, 234 and 252, force the first gasket 212 into sealing engagement with both electrical wires 258 and the surfaces 228 and 242.

The support plate 136 includes a pilot portion 260 that projects downwardly between the first seal-receiving surface 242 and the shoulder portion 226. The pilot portion 260 includes a compression ring, or seal, 262 that extends downwardly therefrom, and the second seal-receiving surface 244 of the pressure ring 210 includes a compression ring 264 that extends upwardly therefrom, so that the second gasket 220 is compressed between the compression rings 262 and 264 and is forced outwardly into sealing contact with the third cylindrical opening 198 of the cap-to-casing adapter 166.

The embodiment of FIGS. 5-7 provides an airtight seal as the clamping bolts 214 are tightened. The gasket 212 is lathe cut from a synthetic elastomer of 70 Durometer. Clearance between the well casing 12 and the pilot portion 260 is easily sealed by the second gasket 220; and excess material of the gasket 220 can be extruded into a clearance between the pilot portion 260 and the well casing 12. Thus, the compressibility of the second gasket 220, being narrower and more compressible than the first gasket 212, provides tolerance for achieving adequate compression on the first gasket 212.

Referring to FIGS. 4 and 9, the larger compression rings, 230, 232, and 250, and the smaller compression rings, 234 and 252, make it unnecessary to compress the gasket 212 except in the areas deformed by the compression rings, 230, 232, 234, 250, and 252. Thus, adequate sealing of all surfaces is achieved without regard to tolerances of the various parts.

The embodiment of FIGS. 3 and 4 may be equipped with the sealed support plate assembly 206 that includes the pressure ring 210 and the other sealing parts which were described in conjunction with FIGS. 5-7, thereby providing a fluid-tight well, such as is used for artesian wells, or for wells in which the well cap 138 is disposed below ground level.

Further, the embodiment of FIGS. 5-7, although shown and described with the sealed support plate assembly 206 which provides a fluid-tight well, can be used without the pressure ring 210 and the other sealing parts, to make a well in which the well can breath, and in which insects are excluded from the well by the screened passageways 192a and 192b.

In summary, the present invention includes a sizing adapter, or a cap-to-casing adapter 166, that provides screened passageways 192a and 192b, that provides a means for locking the well cap 138 to the well casing 12 with a key-released lock, or padlock, 188, and that allows the sealed support plate assembly 206 to be used irrespective of the wall thickness 202 of the well casing 12 and the resultant variation of the inside diameter 200 of the well casing 12.

An adaptable well closure assembly 318 includes a support plate 136, a well cap 138, and an adapter 166.

The embodiment of FIGS. 3 and 4 optionally includes the sealed support plate assembly 206 of FIGS. 5-7. In this embodiment, not shown, an airtight, or watertight, seal is made between the support plate 136 and the well casing 12.

The embodiment of FIGS. 5-7 optionally omits the sealed support plate assembly 206, and uses only the support plate 136. In this embodiment, not shown, insect-proof passageways, or screened passageways, 192a and 192b, allow the well to breathe air.

The embodiments of FIGS. 1-2, 3-4, and 5-7, are formed from plastic materials; so that long life, freedom from corrosion, and economy are all achieved by the present invention.

Preferably the well caps, 46 and 138, and the cap-to-casing adapter 166, are molded from polycarbonate; and the support plates, 26 and 136, are molded from polyvinyl chloride.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

Industrial Applicability

The present invention is applicable to water wells for use in providing water in homes and on lawns, for use in industry, for irrigation of farmland or drinking water for livestock, and for providing water commercially.

What is claimed is:

1. A well closure assembly (318) for use with a well having a well casing (12) that includes a longitudinal axis (14) and a top (28) that is orthogonal to said axis, which well closure assembly comprises:
   a support plate (136) having means (34) for supporting a well pipe (43) in said well casing;
   well cap means (138) for closing said well; and
   an adapter (166) being inserted between said well casing and said well cap means, having means (168, 172) for operatively engaging said well casing, having means (176) for operatively engaging said well cap means, having means (170) for operatively attaching an electrical conduit (146) to said adapter, having means (173, 190) for operatively engaging said support plate, and having means (198) for selective rotational positioning of said support plate with respect to said means for operatively attaching said electrical conduit.

2. A well closure assembly (318) as claimed in claim 1 in which said means for operatively engaging said support plate (136) comprises means (173) for spacing said support plate above said top (28) of said well casing.

3. A well closure assembly (318) as claimed in claim 1 in which said means for selective rotational positioning of said support plate (136) comprises an opening (198) in said adapter (166) that is disposed above said means (168, 172) for said adapter operatively engaging said well casing (12).

4. A well closure assembly (318) as claimed in claim 1 in which said support plate (136) includes a pilot portion (260);
   said adapter (166) includes an opening (198) that is coaxial with said longitudinal axis; and
   said means for selective rotational positioning of said support plate comprises said pilot portion being inserted into said opening.

5. A well closure assembly (318) as claimed in claim 1 in which said means for selective rotational positioning of said support plate (136) comprises means (194, 196) for rotationally indexing said support plate (136) to a plurality of preselected rotational positions.

6. A well closure assembly (318) as claimed in claim 5 in which said means for rotationally indexing said support plate (136) comprises selective engagement of a lug (194) and a slot (196).

7. A well closure assembly (318) as claimed in claim 1 in which said adapter includes an upper portion (176);
   said well cap means (138) includes a flange (140) that circumscribes a unitary opening (141); and
   said means for said adapter (166) operatively engaging said well cap means comprises said upper portion being slidably inserted into said unitary opening.

8. A well closure assembly (318) as claimed in claim 1 in which said adapter (166) includes means, comprising a screened passageway (192a, 192b) for providing insect-proof breathing of said well.

9. A well closure assembly (318) as claimed in claim 1 in which said well cap means (138) includes a flange (140) that circumscribes a unitary opening (141) in said well cap means;
   said means for said adapter operatively engaging said well cap means comprises an upper portion (176) of said adapter and slidable insertion of said upper portion into said unitary opening; and
   said well closure assembly includes means, comprising said slidable insertion of said uppor portion with said unitary opening, and comprising a lock (188) that is disposed radially outward from said well casing, for locking said well cap means to said adapter.

10. A well closure assembly (318) as claimed in claim 1 in which said support plate (136) includes a pilot portion (260);
    said adapter (166) includes a cylindrical opening (198);
    said means for selective rotational positioning of said support plate (136) comprises said pilot portion being inserted into said cylindrical opening; and
    said means for selective rotational positioning includes means, comprising a lug (194) and a slot (196) that are selectively engageable, for rotationally indexing said support plate (136) to a plurality of preselected rotational positions with respect to said adapter (166).

11. A well closure assembly (318) for use with a well having a well casing (12) that includes a longitudinal axis (14) and a top (28) that is orthogonal to said axis, which well closure assembly comprises:
    a support plate (136) having means (34) for supporting a well pipe (43) in said well casing;
    well cap means (138) for closing said well;
    an adapter (166) being inserted between said well casing and said well cap means, having means (168, 172) for operatively engaging said well casing, having means (176) for operatively engaging said well cap means, having means (170) for providing a connection between said adapter and an electrical conduit (146), and having means, comprising an opening (198) that is coaxial with said longitudinal axis, for operatively engaging said support plate; and
    means, comprising said opening in said adapter, and comprising a seal (262) that sealingly engages both said opening and said support plate, for sealing between said support plate (136) and said adapter; whereby said well closure assembly provides a water-tight seal with said well casing without regard to variations in the inside diameter (200) of said well casing (12).

12. A well closure assembly (318) as claimed in claim 11 in which said support plate (136) includes a pilot portion (198); and said means for sealing between said support plate and said adapter (166) comprises a pressure ring (210) that is slidably inserted into said opening (198) and that compressively forces said seal (262) against said pilot portion, a first bolt hole (160) in said support plate, a second bolt hole (246) in said pressure ring, and a bolt (214) that operatively engages both of said bolt holes.

13. A well closure assembly (318) as claimed in claim 12 in which said first bolt hole (160) extends through said support plate (136);

said support plate includes a first wire hole (164) that extends therethrough;

said pressure ring (210) includes a second wire hole (248) that extends therethrough; and said well closure assembly includes means (212) for sealing between said first bolt hole and said bolt (214), and between said first wire hole and a wire (258) inserted therethrough.

14. A well closure assembly (318) as claimed in claim 13 in which said means for sealing between said first bolt hole (160) and said bolt (214) comprises a compression ring (250, 252, 262, 264) that circumscribes one of said holes (160, 164, 246, 248).

15. A well closure assembly (318) as claimed in claim 14 in which said means for sealing between said first bolt hole (160) and said bolt (214) comprises a second seal (212) that is disposed between said support plate (136) and said pressure ring (210), and said compression ring (250, 252, 262, 264) compressively engaging said second seal (212).

16. A well closure assembly (318) as claimed in claim 11 in which said well cap means (138) includes a flange (140) that circumscribes a unitary opening (141) in said well cap means;

said means for said adapter operatively engaging said well cap means comprises an upper portion (176) of said adapter and slidable insertion of said upper portion into said unitary opening; and said well closure assembly includes means, comprising said slidable insertion of said upper portion into said unitary opening, and comprising a lock (188) that is disposed radially outward from said well casing, for locking said well cap means to said adapter.

17. A well closure assembly (318) as claimed in claim 11 in which said means for operatively engaging said support plate (136) comprises means (173, 226) for spacing said support plate above said top (28) of said well casing (12).

18. A well closure assembly (318) for use with a well having a well casing (12) that includes a longitudinal axis (14) and a top (28) that is orthogonal to said axis, which well closure assembly comprises:

a well cap (138) having a flange (140) that circumscribes a unitary opening (141) in said well cap;

an adapter (166) being inserted between said well casing and said well cap, having means (168, 172) for engaging said well casing, and having an upper portion (176) that is disposed above said top of said well casing for slidably engaging said means, comprising said slidable engagement of said upper portion of said adapter in said unitary opening of said well cap, and comprising a lock (188) that is disposed radially outward from said well casing, for locking said well cap to said adapter.

19. A well closure assembly (318) as claimed in claim 18 in which said means for locking said well cap (138 to said adapter (166) comprises a first hole (180) in said well cap that is disposed radially outward of said well casing (12), and a second hole (182) in said adapter (166) that is disposed radially outward of said well casing; and said lock comprises a padlock (188) with a shackle (190) that is inserted through both of said holes.

20. A cap-to-casing adapter (166) for insertion between the well casing and the well cap of a well having a well casing (12) with a top (28), having a well cap (138), and having a support plate (136) with means (34) for supporting a well pipe (43) in said well casing, which adapter comprises;

means (168, 172) for operatively engaging said well casing;

means (176) for extending upwardly of said well casing and into said well cap;

means (173, 198) for operatively engaging said support plate; and means (170) for operatively attaching an electrical conduit (146) to said adapter.

21. A cap-to-casing adapter (166) as claimed in claim 20 in which said means for operatively engaging said support plate (136) comprises means (173, 226) for spacing said support plate above said top (28) of said well casing (12).

22. A cap-to-casing adapter (166) as claimed in claim 20 in which said means for selective rotational positioning of said support plate (136) comprises an opening (198) in said adapter (166) that is disposed above said means (168, 172) for said adapter operatively engaging said well casing (12).

23. A cap-to-casing adapter (166) as claimed in claim 20 in which said support plate (136) includes a pilot portion (260);

said adapter (166) includes a cylindrical opening (198); and said positioning of said support plate in said adapter comprises said pilot portion engaging said cylindrical opening.

24. A cap-to-casing adapter (166) as claimed in claim 20 in which said adapter (166) includes means, comprising a screened passageway (192a, 192b) for providing insect-proof breathing of said well.

25. A well closure assembly (318) for use with a well having a well casing (12), which well closure assembly comprises:

a support plate (136) having means (34) for supporting a well pipe in said well casing;

a well cap (138) having means, comprising a flange (140), for enclosing said support plate; and an adapter (166), being inserted between said well casing and said well cap, for supporting said support plate above said top of said well casing.

* * * * *

UNITED STATES PATENT AND TRADEMARK OFFICE
CERTIFICATE OF CORRECTION

PATENT NO. : 4,887,669

DATED : December 19, 1989

INVENTOR(S) : Cecil H. Paulus

It is certified that error appears in the above-identified patent and that said Letters Patent is hereby corrected as shown below:

In column 10, --unitary opening of said well cap; and-- should be inserted between "said" and "means" in line 5; and "(138" should be --(138)-- in line 12.

Signed and Sealed this

Twenty-ninth Day of May, 1990

Attest:

HARRY F. MANBECK, JR.

Attesting Officer

Commissioner of Patents and Trademarks